United States Patent
Kuehne et al.

(10) Patent No.: US 9,201,502 B2
(45) Date of Patent: Dec. 1, 2015

(54) METHOD FOR OPERATING AN OPERATING DEVICE OF A MOTOR VEHICLE USING GAZE DETECTION

(71) Applicant: AUDI AG, Ingolstadt (DE)

(72) Inventors: Marcus Kuehne, Ingolstadt (DE); Ulrich Mueller, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/387,443

(22) PCT Filed: Nov. 23, 2012

(86) PCT No.: PCT/EP2012/004845
§ 371 (c)(1),
(2) Date: Sep. 23, 2014

(87) PCT Pub. No.: WO2013/139358
PCT Pub. Date: Sep. 26, 2013

(65) Prior Publication Data
US 2015/0084854 A1 Mar. 26, 2015

(30) Foreign Application Priority Data
Mar. 23, 2012 (DE) .................... 10 2012 005 886

(51) Int. Cl.
*G06F 3/01* (2006.01)
*B60K 37/06* (2006.01)
*G06K 9/00* (2006.01)

(52) U.S. Cl.
CPC ............ *G06F 3/013* (2013.01); *G06K 9/00355* (2013.01); *B60K 37/06* (2013.01);
(Continued)

(58) Field of Classification Search
CPC ........... G06F 3/01; G06F 3/013; G06F 3/017;
B60K 37/06; B60K 2350/1052; B60K 2350/2013; B60K 2350/35; B60K 2350/355; B60K 2350/962; B60K 2350/965; B60K 2350/00; G02B 2027/0138; G06K 9/00335; G06K 9/00355
See application file for complete search history.

(56) References Cited

U.S. PATENT DOCUMENTS

2005/0116929 A1* 6/2005 Molander et al. ............. 345/157
2007/0013868 A1* 1/2007 Pugach et al. ................ 351/209
(Continued)

FOREIGN PATENT DOCUMENTS

DE 10 2005 023 214 A1 11/2006
DE 10 2007 049 710 A1 4/2009
(Continued)

OTHER PUBLICATIONS

WIPO provided English translation of the International Preliminary Report on Patentability uploaded on the WIPO website on Sep. 23, 2014 for corresponding International Patent Application No. PCT/EP2012/004845.
(Continued)

*Primary Examiner* — Larry Sternbane
(74) *Attorney, Agent, or Firm* — Staas & Halsey LLP

(57) ABSTRACT

An operating device of a motor vehicle has at least one display unit for displaying changeable information. Gaze detection is used to check whether the operator's gaze is directed at the at least one display unit. An input command in a first group of input commands is not executed if the operator's gaze is not directed at the at least one display unit for a certain time period during the input command. For a second group of input commands, the input command is executed irrespective of gaze detection.

10 Claims, 2 Drawing Sheets

(52) U.S. Cl.
CPC .... *B60K 2350/00* (2013.01); *B60K 2350/1052* (2013.01); *B60K 2350/2013* (2013.01); *B60K 2350/35* (2013.01); *B60K 2350/355* (2013.01); *B60K 2350/962* (2013.01); *B60K 2350/965* (2013.01); *G06F 3/017* (2013.01)

(56) References Cited

U.S. PATENT DOCUMENTS

| | | | |
|---|---|---|---|
| 2008/0236275 A1 | 10/2008 | Breed et al. | |
| 2009/0125233 A1* | 5/2009 | Shibasaki | 701/208 |
| 2010/0121501 A1 | 5/2010 | Neugebauer et al. | |
| 2010/0121645 A1 | 5/2010 | Seitz et al. | |
| 2011/0029918 A1* | 2/2011 | Yoo et al. | 715/800 |
| 2011/0050589 A1 | 3/2011 | Yan et al. | |
| 2012/0169582 A1* | 7/2012 | Tschirhart | 345/156 |
| 2014/0292665 A1* | 10/2014 | Lathrop et al. | 345/173 |

FOREIGN PATENT DOCUMENTS

| | | | |
|---|---|---|---|
| DE | 10 2009 034 068 A1 | 5/2010 | |
| DE | 10 2009 034 069 A1 | 5/2010 | |
| DE | 10 2012 005 886.1 | 3/2012 | |
| DE | 102012219280 A1 * | 4/2014 | ............ B60R 16/02 |
| WO | WO 99/42315 A1 | 8/1999 | |
| WO | WO 2009/049975 A1 | 4/2009 | |
| WO | PCT/EP2012/004845 | 11/2012 | |

OTHER PUBLICATIONS

Search Report issued Aug. 29, 2012 for corresponding German Patent Application No. 10 2012 005 886.1.

International Search Report mailed Jul. 3, 2013 for corresponding International Patent Application No. PCT/EP2012/004845.

* cited by examiner

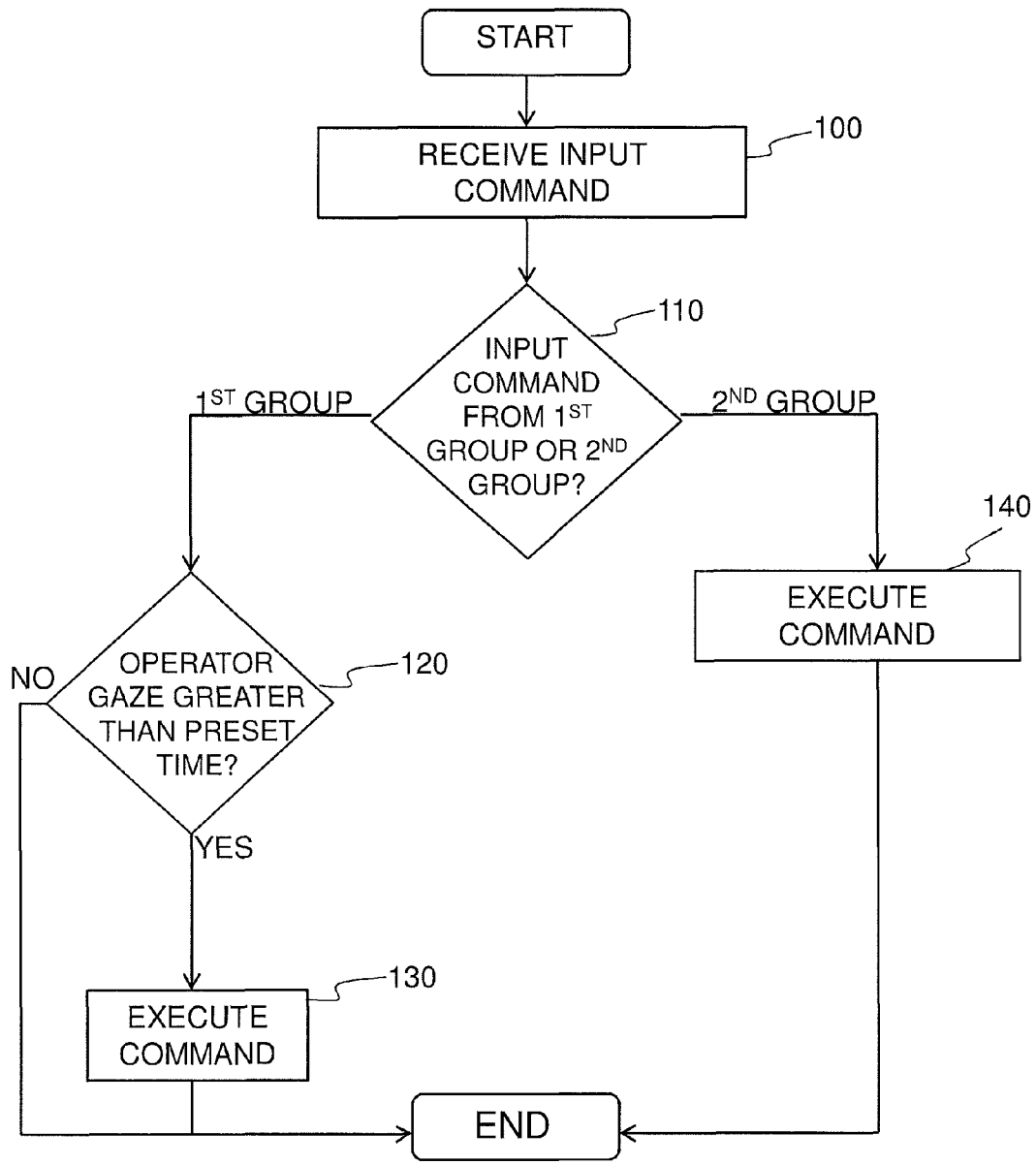

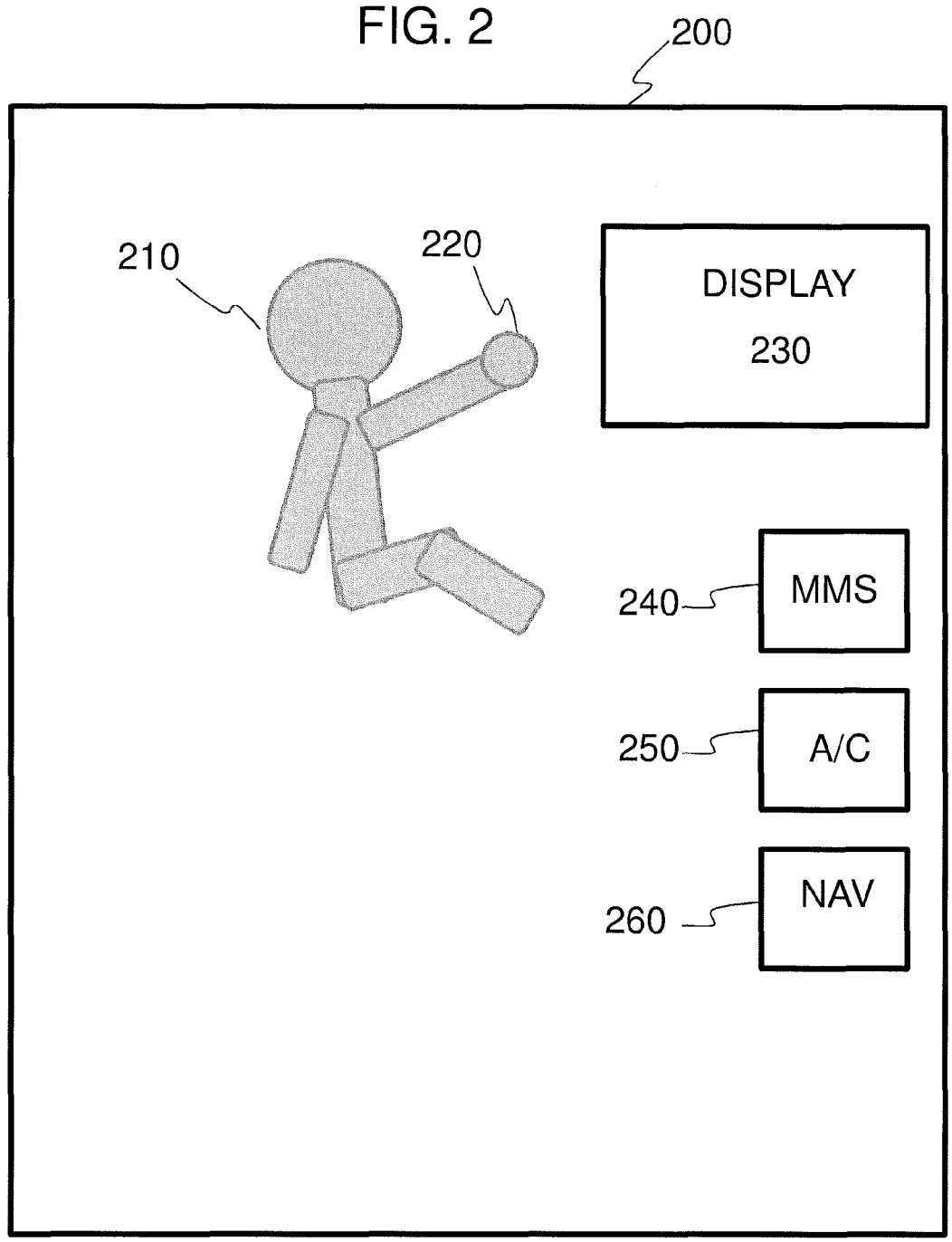

METHOD FOR OPERATING AN OPERATING DEVICE OF A MOTOR VEHICLE USING GAZE DETECTION

CROSS REFERENCE TO RELATED APPLICATIONS

This application is based on and hereby claims priority to International Application No. PCT/EP2012/004845 filed on Nov. 23, 2012 and German Application No. 10 2012 005 886.1 filed on Mar. 23, 2012, the contents of which are hereby incorporated by reference.

BACKGROUND

The invention relates to a method for operating an operating device of a motor vehicle. Such a method is known from DE 10 2009 034 068 A1.

DE 10 2009 034 068 A1 discloses a method in which gaze detection is used to check whether an operator's gazing direction is directed at a display unit during an input command for the operating device. If the gazing direction is not directed at the display unit during the input command, the input command is not executed.

SUMMARY

One possible object is to simplify such an operating method with regard to operation and to improve traffic safety.

The inventor proposes a method for operating an operating device of a motor vehicle. In the method, two groups of input commands are defined on the basis of the gaze detection requirement, in which case, for the first group of input commands, the input command is executed only when the operator's gaze is directed at the at least one display unit for a certain period of time during the input command, whereas, for the second group of input commands, the input command is executed irrespective of the gaze detection. Such a method simplifies the operation of the operating device since, for the second group of input commands, the operator does not necessarily need to direct his gaze at a display unit in order to specify these input commands. Furthermore, traffic safety is increased since the operator, who is generally the driver of the motor vehicle, does not need to look away from the road if he specifies an input command from the second group of input commands.

In one advantageous development of the proposed method, the input command from the first group of input commands is executed only when the operator gazes at the at least one display unit for a period of time of 1 second to 10 seconds during the input command. Such a refinement ensures that an unwanted input command does not result if the operator's gaze roams over the at least one display unit while he accidentally specifies an input command (for example by accidentally touching an operating element).

In another advantageous development, the input commands are specified using gestures. This makes it possible to considerably reduce the number of operating elements in a vehicle, which in turn improves traffic safety since the operator does not first need to look for the relevant operating element and can therefore direct his gaze at the traffic.

Within the scope of another refinement, provision is made for a multimedia system and/or an air-conditioning system of the motor vehicle to be operated using the second group of input commands since they generally require less complex input commands than a navigation system, for example. Such input commands may be, for example, volume control for a multimedia system, changing a radio station or controlling the temperature of an air-conditioning system. This refinement ensures that the less complex input commands do not require the display unit to be gazed at, which takes into account traffic safety.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a flowchart of a method of executing an input command according to an embodiment of the disclosure; and FIG. 2 shows a motor vehicle according to an embodiment of the disclosure.

DETAILED DESCRIPTION

Reference will now be made in detail to embodiments of the disclosure, examples of which are illustrated in the accompanying drawings.

With reference to FIG. 1, a method for operating an operating device of a motor vehicle is shown. In the method, two groups of input commands are defined on the basis of the gaze detection requirement. For example, the input commands may be specified using gestures. This makes it possible to considerably reduce the number of operating elements in a vehicle, which in turn improves traffic safety since the operator does not first need to look for the relevant operating element and can therefore direct his gaze at the traffic.

When an input command is received via a display unit from an operator at operation 100, a determination is made as to whether the input command is from a first group of input commands or a second group of input commands at operation 110.

If the input command is from the first group of input commands, it is determined whether the operator's gaze is directed at the display unit for a certain period of time during the input command at operation 120. If the operator's gaze is directed at the display unit for the certain period of time during the input command, the input command is executed at operation 130 and the method is ended. If the operator's gaze is not directed at the display unit for the certain period of time during the input command, the input command is not executed at operation 130 and the method is ended.

For example, the input command from the first group of input commands may be executed only when the operator gazes at the at least one display unit for a period of time of 1 second to 10 seconds during the input command. Such a refinement ensures that an unwanted input command does not result if the operator's gaze roams over the display unit while he accidentally specifies an input command (for example by accidentally touching an operating element).

If the input command is from the second group of input commands, the input command is executed at operation 140 irrespective of the gaze detection and the method is ended. Such a method simplifies the operation of the operating device since, for the second group of input commands, the operator does not necessarily need to direct his gaze at a display unit in order to specify these input commands. Furthermore, traffic safety is increased since the operator, who is generally the driver of the motor vehicle, does not need to look away from the road if he specifies an input command from the second group of input commands.

Within the scope of the disclosure, provision is made for a multimedia system and/or an air-conditioning system of the motor vehicle to be operated using the second group of input commands since they generally require less complex input commands than a navigation system, for example, which may be operated using the first group of input commands. Such input commands for the second group of input commands may be, for example, volume control for a multimedia system, changing a radio station or controlling the temperature of an air-conditioning system. This refinement ensures that the less complex input commands do not require the display unit to be gazed at, which takes into account traffic safety.

With reference to FIG. 2, a motor vehicle 200 is shown, in which an operator 210 provides an input command, for example, using a gesture 220, to operate an operating device such as a multimedia system 240, an air-conditioning system, 250, or a navigation system 260. A determination may be made as to whether the operator 210 gazes at a display unit 230 while inputting the command based on the type of command being inputted. Execution of the input command may be performed according to the method described above with respect to FIG. 1.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating at least one operating device of a motor vehicle, comprising:
    displaying variable information via a display unit including displaying operating information for both a first operating device and a second operating device of the motor vehicle;
    receiving an input command at the display unit;
    determining if the received input command is a first command from a first group of commands or a second command from a second group of commands;
    if the received input command is determined to be from the first group,
        performing gaze detection to check whether an operator's gaze is directed at the display unit;
        executing the first command if the operator's gaze is directed at the display unit for a predetermined period of time while the first command is being input; and
        preventing execution of the first command if the operator's gaze is not directed at the display unit for the predetermined period of time while the first command is being input; and
    if the received input command is determined to be from the second group,
        executing the second command irrespective of whether the operator's gaze is directed at the display unit,
    wherein
    the first group of commands operates the first operating device of the motor vehicle, and
    the second group of commands operates the second operating device of the motor vehicle.

2. The method as claimed in claim 1, wherein the predetermined period of time is 1 second to 10 seconds.

3. The method as claimed in claim 1, wherein gesture recognition is used to input at least one of the first command and the second command.

4. The method as claimed in claim 1, wherein the second group of commands operates at least one of a multimedia system and an air-conditioning system.

5. The method as claimed in claim 4, wherein the second group of commands comprises at least one command selected from the group consisting of a volume control command for the multimedia system, a radio station changing command for the multimedia system and a temperature controlling command for the air-conditioning system.

6. The method as claimed in claim 1, wherein execution of the first command is delayed until the operator's gaze has been directed at the display unit for the predetermined period of time.

7. The method as claimed in claim 1, wherein the first group of commands operates a navigation system.

8. The method as claimed in claim 1, wherein gaze detection is performed for a single display unit, for both the first command and the second command.

9. The method as claimed in claim 1, wherein commands from the first group of commands are more complex to input relative to commands from the second group of commands.

10. The method as claimed in claim 1, wherein
    gesture recognition is used to input the first command and the second command, and
    a first gesture to input the first command is more complex to input relative to a second gesture to input the second command.

* * * * *